US 12,508,935 B2

(12) United States Patent
Tabata et al.

(10) Patent No.: US 12,508,935 B2
(45) Date of Patent: Dec. 30, 2025

(54) CONTROL DEVICE, SERVER, AND STORAGE MEDIUM CONFIGURED TO FIX A MASTER VEHICLE THAT CONTROLS ELECTRIC POWER SUPPLY OF A PLURALITY OF VEHICLES BASED ON ELECTRIC POWER SUPPLY INFORMATION

(71) Applicant: TOYOTA JIDOSHA KABUSHIKI KAISHA, Toyota (JP)

(72) Inventors: Mitsuhiro Tabata, Sunto-gun (JP); Motoki Takahashi, Susono (JP); Naofumi Magarida, Sunto-gun (JP); Yuko Azuma, Numazu (JP); Takaharu Tateishi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 778 days.

(21) Appl. No.: 17/812,502

(22) Filed: Jul. 14, 2022

(65) Prior Publication Data
US 2023/0061632 A1 Mar. 2, 2023

(30) Foreign Application Priority Data
Aug. 25, 2021 (JP) .................................. 2021-137409

(51) Int. Cl.
*B60L 53/66* (2019.01)
*B60L 53/62* (2019.01)
(Continued)

(52) U.S. Cl.
CPC .............. *B60L 53/66* (2019.02); *B60L 53/62* (2019.02); *B60L 53/63* (2019.02); *B60L 53/65* (2019.02);
(Continued)

(58) Field of Classification Search
CPC .......... B60L 53/66; B60L 53/62; B60L 53/63; B60L 53/65; B60L 53/68; B60L 55/00; H02J 3/322; H02J 9/00
(Continued)

(56) References Cited

U.S. PATENT DOCUMENTS

2008/0077286 A1* 3/2008 Oyobe .................... H02J 3/322
903/902
2010/0017045 A1* 1/2010 Nesler .................. B60L 53/665
700/295
(Continued)

FOREIGN PATENT DOCUMENTS

JP 2001224133 A * 8/2001
JP 2008236902 A * 10/2008
(Continued)

*Primary Examiner* — Drew A Dunn
*Assistant Examiner* — Manuel Hernandez
(74) *Attorney, Agent, or Firm* — Oblon, McClelland, Maier & Neustadt, L.L.P.

(57) ABSTRACT

A control device includes a processor configured to: acquire electric power supply information indicating suppliable electric energy by each of a plurality of vehicles and electric power demand information indicating demanded electric energy of a facility to which each of the vehicles supply electric power; fix a master vehicle that controls electric power supply of each of the vehicles from among the vehicles based on the electric power supply information; and control electric energy when each of the vehicles supplies the electric power to the facility based on the electric power supply information of the master vehicle and the electric power demand information.

18 Claims, 7 Drawing Sheets

(51) Int. Cl.
    *B60L 53/63*     (2019.01)
    *B60L 53/65*     (2019.01)
    *B60L 53/68*     (2019.01)
    *B60L 55/00*     (2019.01)
    *H02J 3/32*     (2006.01)
    *H02J 9/00*     (2006.01)

(52) U.S. Cl.
    CPC ............... *B60L 53/68* (2019.02); *B60L 55/00* (2019.02); *H02J 3/322* (2020.01); *H02J 9/00* (2013.01)

(58) Field of Classification Search
    USPC .......................................................... 320/109
    See application file for complete search history.

(56) References Cited

U.S. PATENT DOCUMENTS

| | | | | |
|---|---|---|---|---|
| 2010/0082464 A1* | 4/2010 | Keefe | ................... | G06Q 40/12 705/30 |
| 2012/0187900 A1* | 7/2012 | Murawaka | ................ | B60L 7/12 320/106 |
| 2015/0239362 A1* | 8/2015 | Mizuno | ................... | B60L 55/00 307/10.1 |
| 2015/0251547 A1* | 9/2015 | Nonomura | ............. | B60L 58/15 320/109 |
| 2016/0164289 A1* | 6/2016 | Oyobe | ................. | H02J 7/0013 180/65.245 |
| 2016/0178678 A1* | 6/2016 | Pelletier | ............ | G01R 21/1333 700/291 |
| 2018/0178669 A1* | 6/2018 | Kudo | .................... | H02J 7/0068 |
| 2019/0337394 A1 | 11/2019 | Butash et al. | | |
| 2021/0316631 A1* | 10/2021 | Morgan | ................. | B60L 53/62 |
| 2022/0305940 A1* | 9/2022 | Kobuna | ................. | B60L 58/16 |
| 2022/0379768 A1* | 12/2022 | Hoki | ....................... | B60L 53/36 |

FOREIGN PATENT DOCUMENTS

| | | |
|---|---|---|
| JP | 2015-171219 A | 9/2015 |
| JP | 2017-112806 A | 6/2017 |
| JP | 2021-86191 A | 6/2021 |

* cited by examiner

CONTROL DEVICE, SERVER, AND STORAGE MEDIUM CONFIGURED TO FIX A MASTER VEHICLE THAT CONTROLS ELECTRIC POWER SUPPLY OF A PLURALITY OF VEHICLES BASED ON ELECTRIC POWER SUPPLY INFORMATION

CROSS-REFERENCE TO RELATED APPLICATION

This application claims priority to Japanese Patent Application No. 2021-137409 filed on Aug. 25, 2021, incorporated herein by reference in its entirety.

BACKGROUND

1. Technical Field

The present disclosure relates to a control device, a server, and a storage medium.

2. Description of Related Art

Japanese Unexamined Patent Application Publication No. 2017-112806 (JP 2017-112806 A) discloses a technique to externally supply electric power to a facility such as an evacuation center using a plurality of vehicles in the event of a power shortage due to a disaster.

SUMMARY

However, in the above-mentioned JP 2017-112806 A, when electric power is supplied to the facility using the vehicles, a change in frequency caused by a difference between the demanded electric energy on the facility side and electric energy supplied by the vehicles is not taken into consideration at all.

The present disclosure is made in view of the above, and an object of the present disclosure is to provide a control device, a server, and a storage medium capable of maintaining frequency constant even when electric power is supplied to a facility using a plurality of vehicles.

In order to solve the above-mentioned issue and achieve the object, an control device according to the present disclosure includes a processor configured to: acquire electric power supply information indicating suppliable electric energy by each of a plurality of vehicles and electric power demand information indicating demanded electric energy of a facility to which each of the vehicles supplies electric power; fix a master vehicle that controls electric power supply of each of the vehicles from among the vehicles based on the electric power supply information; and control electric energy when each of the vehicles supplies the electric power to the facility based on the electric power supply information of the master vehicle and the electric power demand information.

Further, a server according to the present disclosure includes a processor configured to: acquire electric power supply information indicating suppliable electric energy by each of a plurality of vehicles and electric power demand information indicating demanded electric energy of a facility to which each of the vehicles supplies electric power; fix a master vehicle that controls electric power supply of each of the vehicles from among the vehicles based on the electric power supply information; and control electric energy when each of the vehicles supplies the electric power to the facility based on the electric power supply information of the master vehicle and the electric power demand information.

Further, a storage medium according to the present disclosure stores a program. The program causes a processor to: acquire electric power supply information indicating suppliable electric energy by each of a plurality of vehicles and electric power demand information indicating demanded electric energy of a facility to which each of the vehicles supplies electric power; fix a master vehicle that controls electric power supply of each of the vehicles from among the vehicles based on the electric power supply information; and control electric energy when each of the vehicles supplies the electric power to the facility based on the electric power supply information of the master vehicle and the electric power demand information.

According to the present disclosure, an effect that, when electric power is supplied to a facility using a plurality of vehicles, frequency can be maintained constant can be achieved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
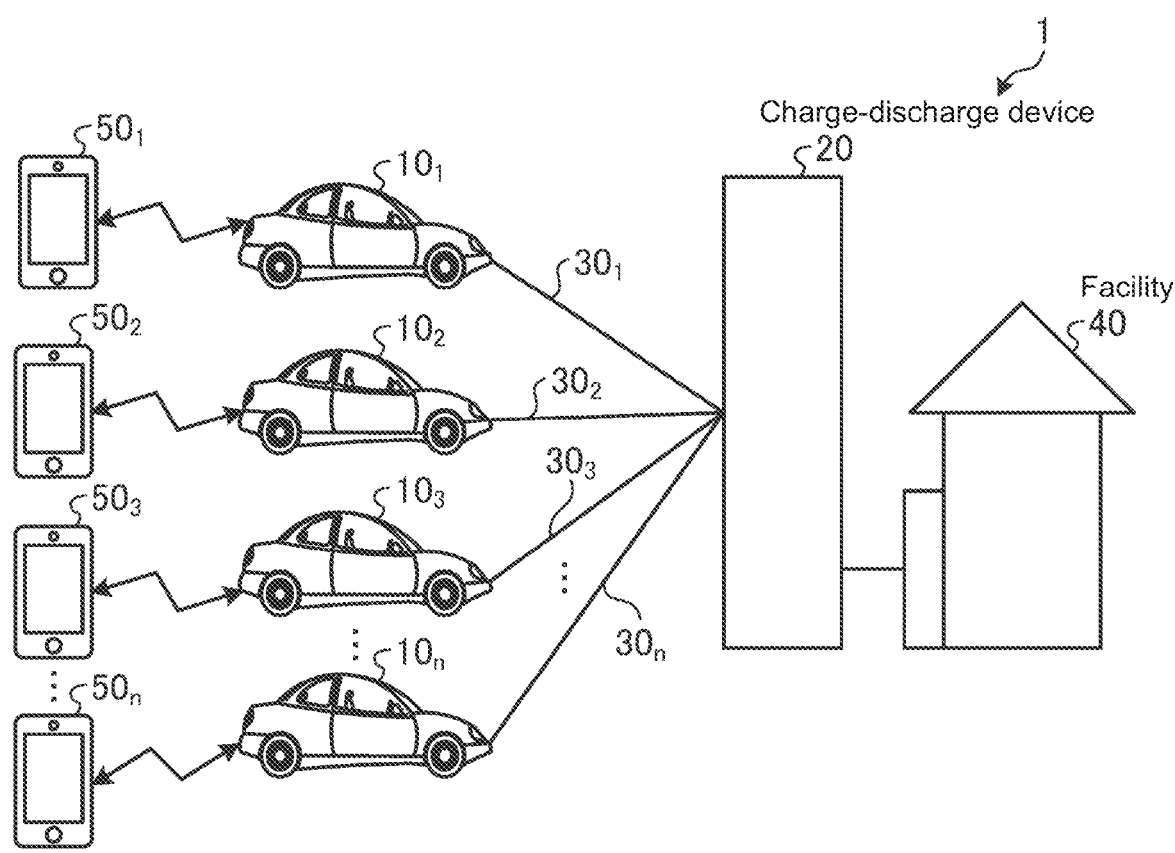
FIG. 1 is a diagram showing a schematic configuration of an electric power system according to a first embodiment.

Hereinafter, a control device, a server, and a storage medium according to embodiments of the present disclosure will be described with reference to the drawings. Note that, the present embodiments do not limit the present disclosure. Further, in the following, the same portions will be described with the same reference numerals.

First Embodiment

Outline Configuration of Electric Power System

FIG. 1 is a diagram showing a schematic configuration of an electric power system according to a first embodiment. An electric power system 1 shown in FIG. 1 includes a plurality of vehicles $10_1$ to $10_n$ (an integer of n=4 or more) (hereinafter, simply referred to as a "vehicle 10" when referring to any of the vehicles $10_1$ to $10_n$), a charge-discharge device 20, a plurality of charge-discharge cables $30_1$ to $30_4$ (hereinafter, simply referred to as "charge-discharge cable 30" when referring to any of the charge-discharge cables $30_1$ to $30_4$), a facility 40, and a plurality of communication terminals $50_1$ to $50_m$ (an integer of m=4 or more) (hereinafter, simply referred to as a "communication terminal 50" when referring to any of communication terminals $50_1$ to $50_m$). Note that FIG. 1 describes a case where the vehicles $10_1$ to $10_n$ supply (discharge) alternating current (AC) power to the facility 40. Further, with reference to FIG. 1, a case where the vehicles $10_1$ to $10_n$ are electrically connected to one charge-discharge device 20 in a parallel state will be described. However, the present disclosure is not limited to this, and can be applied to a case where the charge-discharge device 20 is provided for each of the vehicles $10_1$ to $10_n$ (that is, four charge-discharge devices 20 are provided). As a matter of course, the present disclosure can also be applied to a case where the vehicles $10_1$ to $10_n$ are electrically connected to one charge-discharge device 20 in a series state, and a case where the vehicles $10_1$ to $10_n$ are electrically connected in combination of a series state and a parallel state.

The vehicle 10 is realized using any of a hybrid electric vehicle (HEV), a plug-in hybrid electric vehicle (PHEV), a fuel cell electric vehicle (FCEV), and a battery electric vehicle (BEV). The vehicle 10 is electrically connected to the charge-discharge device 20 via the charge-discharge cable 30. The vehicle 10 supplies (discharges) electric power to an electric load in the facility 40 via the charge-discharge cable 30 and the charge-discharge device 20. Further, the vehicle 10 charges a secondary battery mounted therein with the electric power supplied from the facility 40 via the charge-discharge cable 30 and the charge-discharge device 20. Further, when the vehicle 10 is provided with an electric power generation function such as HEV, PHEV, and FCEV, the generated electric power is supplied (discharged) to the electric load in the facility 40 via the charge-discharge cable 30 and the charge-discharge device 20.

The charge-discharge device 20 is provided between the charge-discharge cable 30 and the facility 40. The charge-discharge device 20 electrically connects the vehicles 10 that are connected in parallel via the charge-discharge cables 30 and the facility 40. The charge-discharge device 20 converts the electric power supplied from the facility 40 into a predetermined voltage value and supplies the converted voltage value to the vehicles 10 connected in parallel via the charge-discharge cables 30. Further, the charge-discharge device 20 converts the electric power supplied (discharged) from the vehicles 10 connected in parallel via the charge-discharge cables 30 into a predetermined voltage value and supplies the converted voltage value to the facility 40.

The facility 40 receives the electric power supplied from the vehicles 10 via the charge-discharge device 20, and also receives commercial system electric power from an electric power transmission line or the like. Further, the facility 40 supplies the electric power to the vehicle 10 via the charge-discharge device 20.

The communication terminal 50 is communicably connected to the vehicle 10 in accordance with a predetermined communication standard, and receives various types of information related to the vehicle 10. In the following, the communication terminal 50 will be described as a mobile phone. However, the present disclosure is not limited to this, and the communication terminal 50 can be applied to, for example, a tablet terminal provided with a display monitor, a wearable device, and the like. Further, the predetermined communication standard is Wi-Fi (registered trademark), Bluetooth (registered trademark), or the like.

Note that FIG. 1 illustrates a case where the vehicles 10 supply discharge) electric power to the facility 40. However, the number of vehicles 10 is not limited to four. Further, in FIG. 1, a case where the vehicles $10_1$ to $10_n$ are electrically connected to one charge-discharge device 20 in a parallel state will be described. However, the present disclosure can be applied to a case where the charge-discharge device 20 is separately provided for each of the vehicles $10_1$ to $10_n$ (that is, four charge-discharge devices 20 are provided).

Functional Configuration of Electric Power System

Figure 2:
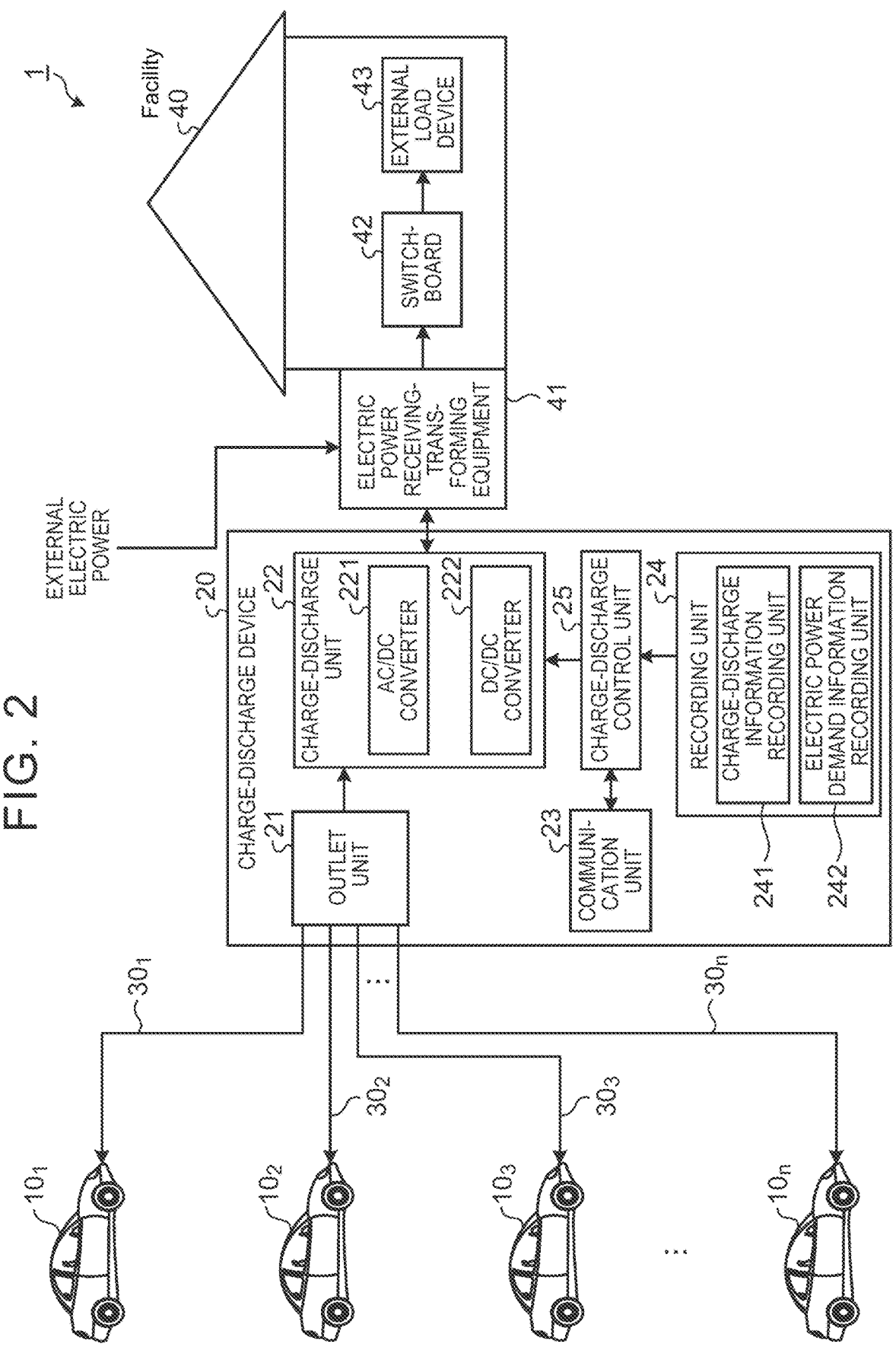
FIG. 2 is a block diagram showing the functional configuration of a charge-discharge device and a facility in the electric power system according to the first embodiment.

Next, the functional configuration of the electric power system 1 will be described. FIG. 2 is a block diagram showing the functional configuration of the charge-discharge device 20 and the facility 40 in the electric power system 1. The configuration of the vehicle 10 will be described below.

Functional Configuration of Charge-discharge Device

First, the functional configuration of the charge-discharge device 20 will be described. As shown in FIG. 2, the charge-discharge device 20 includes an outlet unit 21, a charge-discharge unit 22, a communication unit 23, a recording unit 24, and a charge-discharge control unit 25.

Each plug of the charge-discharge cables 30 is electrically connected to one end of the outlet unit 21 (an electric outlet), and the other end of the outlet unit 21 is electrically connected to the charge-discharge unit 22 and the communication unit 23. The outlet unit 21 includes multiple outlets into which the plugs of the charge-discharge cables 30 can be inserted.

One end of the charge-discharge unit 22 is electrically connected to the outlet unit 21, and the other end is electrically connected to electric power receiving-transforming equipment 41 of the facility 40 described later. Under the control of the charge-discharge control unit 25, the charge-discharge unit 22 supplies electric power from the electric power receiving-transforming equipment 41 of the facility 40 to the vehicle 10 via the outlet unit 21 and the charge-discharge cable 30. Further, under the control of the charge-discharge control unit 25, the charge-discharge unit 22 supplies electric power from the vehicles 10 to the electric power receiving-transforming equipment 41 via the outlet unit 21 and the charge-discharge cables 30. The charge-discharge unit 22 includes at least an alternating current (AC)/direct current (DC) converter 221 capable of bidirectionally converting AC power and DC power, and a DC/DC converter 222 capable of bidirectionally converting DC power.

Under the control of the charge-discharge control unit 25, the AC/DC converter 221 converts the AC power supplied from the electric power receiving-transforming equipment 41 into DC power and outputs the converted DC power to the DC/DC converter 222. Further, under the control of the charge-discharge control unit 25, the AC/DC converter 221 converts the DC power input from the DC/DC converter 222 into AC power and outputs the converted AC power to the electric power receiving-transforming equipment 41.

Further, under the control of the charge-discharge control unit 25, the DC/DC converter 222 converts the DC power input from the AC/DC converter 221 into a predetermined voltage value and outputs the converted voltage value to the outlet unit 21. Further, under the control of the charge-discharge control unit 25, the DC/DC converter 222 converts the DC power input from the outlet unit 21 into a predetermined voltage value and outputs the converted voltage value to the AC/DC converter 221.

The communication unit 23 receives control area network (CAN) data of the vehicle 10 and various types of information related to the vehicle 10 input via the charge-discharge cable 30 and the outlet unit 21, and outputs the received various types of information to the charge-discharge control unit 25. Further, the communication unit 23 transmits various types of information from the charge-discharge control unit 25 to the vehicle 10 via the charge-discharge cable 30 and the outlet unit 21. Further, the communication unit 23 communicates with an external server or the like via a public communication network such as the Internet (not shown) or a network such as a mobile phone communication network.

The recording unit 24 records various types of information related to the charge-discharge device 20. Further, the recording unit 24 includes a charge-discharge information recording unit 241 that records charge-discharge information and an electric power demand information recording unit 242 that records electric power demand information indicating demanded electric energy of the facility 40. Here, the charge-discharge information includes the number of outlets of the outlet unit 21, the number of charge-discharge cables 30 accommodated in the charge-discharge device 20, the type of charge-discharge cables 30, the length of each charge-discharge cable 30, standard information of the outlets, a suppliable voltage value, etc. Further, the electric power demand information is consumed electric energy per hour based on the contracted electric power of the facility 40, the consumed electric energy per hour when the emergency power source installed at the facility 40 is discharged, or the like. For example, when the facility 40 is a hospital or the like, the electric power demand information is the electric energy obtained as a total of electric energy consumed by instruments that need to be driven in the event of a power failure, such as an emergency light, a guide light, an operating room, an elevator, and an oxygen supply device. The recording unit 24 is configured using a dynamic random access memory (DRAM), a read-only memory (ROM), a flash memory, a hard disk drive (HDD), a solid state drive (SSD), and the like.

The charge-discharge control unit 25 is configured using a memory and a processor provided with hardware such as a digital signal processor (DSP), a field-programmable gate array (FPGA) or a central processing unit (CPU). The charge-discharge control unit 25 controls each unit constituting the charge-discharge device 20.

Functional Configuration of Facility

Next, the functional configuration of the facility 40 will be described. The facility 40 includes the electric power receiving-transforming equipment 41, a switchboard 42, and an external load device 43.

The electric power receiving-transforming equipment 41 receives external electric power transmitted from the outside, converts the received external electric power into a predetermined voltage value or the like, and supplies the converted voltage value to the switchboard 42 and the charge-discharge device 20. Further, the electric power receiving-transforming equipment 41 receives the electric power supplied (discharged) from the vehicles 10 via the charge-discharge device 20, and supplies the received electric power to the switchboard 42.

The switchboard 42 is electrically connected to an outlet (not shown) provided in the facility 40, and distributes AC power supplied from the electric power receiving-transforming equipment 41 to the external load device 43.

The external load device 43 is an instrument that consumes electric power. Specifically, the external load device 43 is, for example, a lighting fixture, a storage battery, an elevator, a home electric appliance, a communication device, or the like.

Functional Configuration of Vehicle

Figure 3:
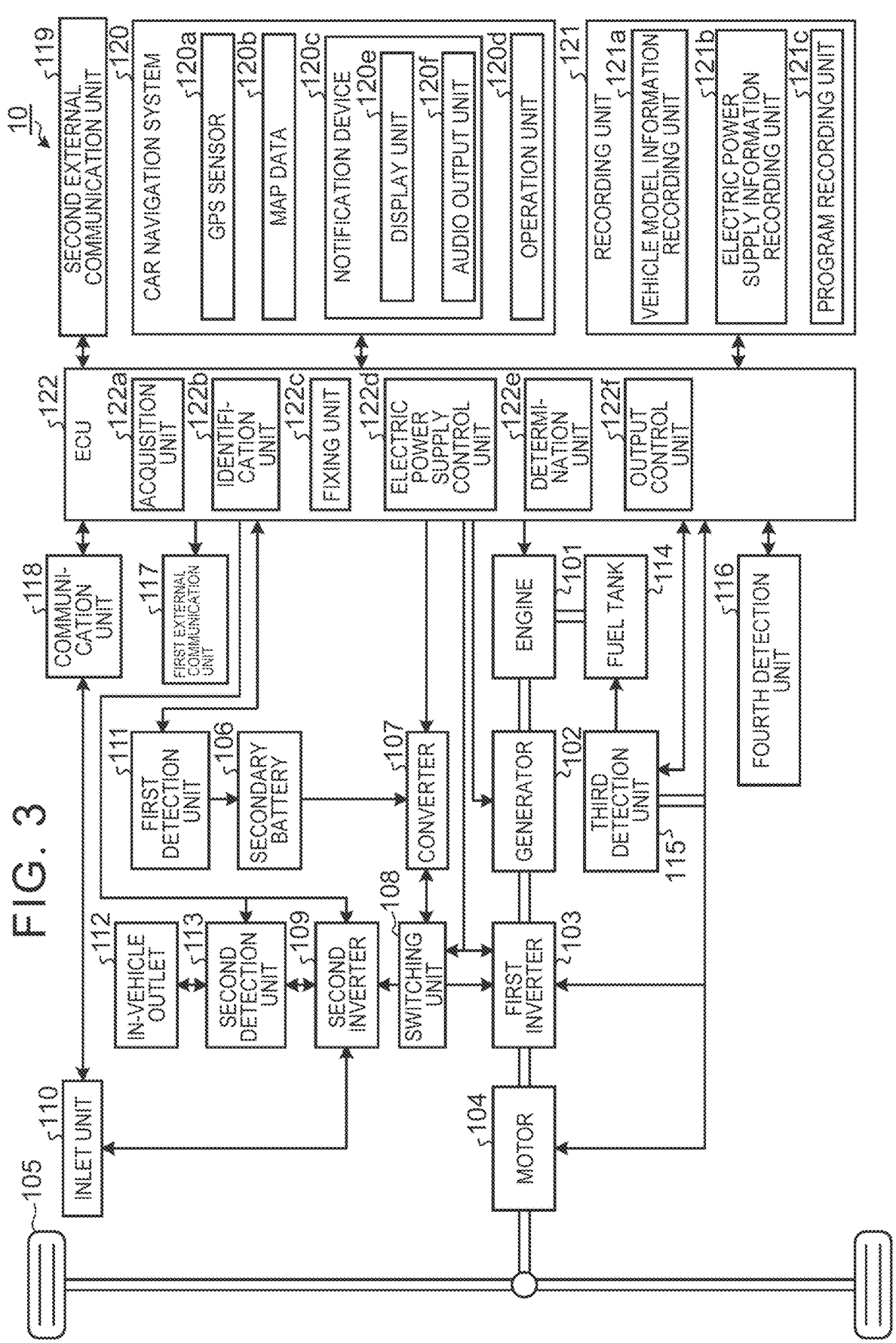
FIG. 3 is a block diagram showing the functional configuration of a vehicle according to the first embodiment.

Next, the detailed functional configuration of the vehicle 10 will be described. FIG. 3 is a block diagram showing the functional configuration of the vehicle 10.

As shown in FIG. 3, the vehicle 10 includes an engine 101, a generator 102, a first inverter 103, a motor 104, drive wheels 105, a secondary battery 106, a converter 107, a switching unit 108, a second inverter 109, an inlet unit 110, a first detection unit 111, an in-vehicle outlet 112, a second detection unit 113, a fuel tank 114, a third detection unit 115, a fourth detection unit 116, a first external communication unit 117, a communication unit 118, a second external communication unit 119, a car navigation system 120, a recording unit 121, and an electric control unit (ECU) 122.

The engine 101 is composed of a known internal combustion engine, and outputs power using fuel stored in the fuel tank 114. The engine 101 is driven under the control of the ECU 122. The power output from the engine 101 drives the generator 102.

The generator 102 is electrically connected to the motor 104 via the first inverter 103. Under the control of the ECU 122, the generator 102 supplies the generated AC power to the secondary battery 106 via the switching unit 108 and the converter 107. The generator 102 is configured using an electric power generation motor generator provided with a motor function in addition to an electric power generation function.

Under the control of the ECU 122, the first inverter 103 converts the discharge power (DC power) from the secondary battery 106 supplied via the switching unit 108 and the converter 107 into the AC power, and supplies the converted AC power to the motor 104. Further, under the control of the ECU 122, the first inverter 103 converts the AC power generated by the motor 104 into the DC power at the time of regenerative braking of the vehicle 10, and supplies the converted DC power to the secondary battery 106 via the switching unit 108 and the converter 107. The first inverter 103 is configured using, for example, a three-phase inverter circuit including a bridge circuit including switching elements for three phases.

Under the control of the ECU 122, the motor 104 is driven by the AC power supplied from the first inverter 103 when the vehicle 10 is accelerated. The power output from the motor 104 drives the drive wheels 105. Further, under the control of the ECU 122, the motor 104 functions as a generator that generates electric power by an external force transmitted from the drive wheels 105 when the vehicle 10 is braked, and the generated electric power is supplied from the first inverter 103 to the secondary battery 106 via the switching unit 108 and the converter 107. The motor 104 is configured using a driving motor generator provided with the motor function in addition to the electric power generation function.

The secondary battery 106 is configured using, for example, a chargeable and dischargeable storage battery such as a nickel hydrogen battery or a lithium ion battery, or an electric power storage element such as an electric double layer capacitor. The secondary battery 106 can be charged and discharged by the converter 107, and stores high-voltage DC power.

One end of the converter 107 is electrically connected to the secondary battery 106, and the other end is electrically connected to one of the first inverter 103 and the second inverter 109 via the switching unit 108. The converter 107 charges and discharges the secondary battery 106 under the control of the ECU 122. Specifically, when the secondary battery 106 is charged, the converter 107 steps down the DC power that is supplied from the outside via the second inverter 109, the inlet unit 110, and the switching unit 108 to a predetermined voltage, and the stepped-down charging current is supplied to the secondary battery 106. On the other hand, when the secondary battery 106 is discharged, the converter 107 boosts the voltage of the DC power from the secondary battery 106, and the boosted discharge current is supplied to the first inverter 103 via the switching unit 108.

One end of the switching unit 108 is electrically connected to the converter 107, and the other end is electrically connected to one of the first inverter 103 and the second inverter 109. Under the control of the ECU 122, the switching unit 108 electrically connects the converter 107 and one of the first inverter 103 and the second inverter 109. The switching unit 108 is configured using a mechanical relay, a semiconductor switch, or the like.

One end of the second inverter 109 is electrically connected to the switching unit 108, and the other end is electrically connected to the inlet unit 110 or the in-vehicle outlet 112. Under the control of the ECU 122, the second inverter 109 converts the discharge power (DC power) supplied from the secondary battery 106 via the switching unit 108 and the converter 107 into the AC power, and supplies the converted AC power to the inlet unit 110. Specifically, under the control of the ECU 122, the second inverter 109 supplies the AC power to the outside via the inlet unit 110 and a charge-discharge cable (not shown). The second inverter 109 is configured using a single-phase inverter circuit or the like so as to correspond to the form of electric power used externally.

One end of the inlet unit 110 is electrically connected to the second inverter 109. A charge-discharge cable (not shown) is detachably connected to the inlet unit 110. The inlet unit 110 supplies the AC power that is supplied from the outside to the second inverter 109 via the charge-discharge cable, and outputs various types of information including control signals and the like that are input from the outside to the communication unit 118. Further, the inlet unit 110 supplies the AC power supplied from the second inverter 109 via the charge-discharge cable to the outside, and outputs various types of information including control signals and the like that are input from the ECU 122 via the communication unit 118 to the outside.

The first detection unit 111 detects each of a state of charge (SOC: charging rate), a temperature, a state of health (SOH), a voltage value, and a current value of the secondary battery 106, and outputs the detection results to the ECU 122. The first detection unit 111 is configured using an ammeter, a voltmeter, a temperature sensor, and the like.

The in-vehicle outlet 112 is electrically connected to the second inverter 109. A power plug of a general electric appliance can be connected to the in-vehicle outlet 112. The AC power supplied from the second inverter 109 is supplied to the electric appliance of which power plug is connected.

The second detection unit 113 is provided between the in-vehicle outlet 112 and the second inverter 109, detects at least one of power consumption and a current value of the electric appliance connected to the in-vehicle outlet 112, and outputs the detection result to the ECU 122. The second detection unit 113 is configured using a wattmeter, an ammeter, a voltmeter, and the like.

The fuel tank 114 stores fuel supplied to the engine 101. Here, the fuel is a fossil fuel such as gasoline. Note that, when the vehicle 10 is an FCEV, hydrogen fuel is stored.

The third detection unit 115 detects the remaining amount of fuel stored in the fuel tank 114, and outputs the detection result to the ECU 122. The third detection unit 115 is configured using a fuel gauge or the like.

The fourth detection unit 116 detects state information of the vehicle 10 and outputs the detection result to the ECU 122. Here, the state information is acceleration, an inclination angle, a speed, and the like of the vehicle 10. The fourth detection unit 116 is configured using an acceleration sensor, a speed sensor, a gyro sensor, and the like.

Under the control of the ECU 122, the first external communication unit 117 transmits various types of information input from the ECU 122 to a server (not shown) in accordance with a predetermined communication standard. Further, the first external communication unit 117 outputs the various types of information received from the server (not shown) to the ECU 122. Here, the predetermined communication standard is a communication standard such as the fourth generation mobile communication system (4G), the fifth generation mobile communication system (5G), and the like. The first external communication unit 117 is configured using a communication module or the like.

The communication unit 118 receives a control signal including various types of information input from the outside via the inlet unit 110, and outputs the received control signal to the ECU 122. Further, the communication unit 118 outputs a control signal including CAN data and the like input from the ECU 122 to the inlet unit 110. The communication unit 118 is configured using a communication module or the like.

Under the control of the ECU 122, the second external communication unit 119 transmits various types of information input from the ECU 122 to the communication terminal 50 in accordance with a predetermined wireless communication standard. Further, the second external communication unit 119 outputs various types of information received from the communication terminal 50 to the ECU 122. Here, the predetermined communication standard is at least one of Wi-Fi (registered trademark) and Bluetooth (registered trademark). The second external communication unit 119 is configured using a wireless communication module or the like.

The car navigation system 120 includes a global positioning system (GPS) sensor 120a, a map database 120b, a notification device 120c, and an operation unit 120d.

The GPS sensor 120a receives signals from a plurality of GPS satellites or transmission antennas, and calculates position information related to the position (longitude and latitude) of the vehicle 10 based on the received signals. The GPS sensor 120a is configured using a GPS receiving sensor or the like. In the first embodiment, the orientation accuracy of the vehicle 10 may be improved by mounting a plurality of the GPS sensors 120a.

The map database 120b stores various types of map data. The map database 120b is configured using a storage medium such as an HDD or an SSD.

The notification device 120c includes a display unit 120e that displays images, maps, videos, and character information, and an audio output unit 120f that generates sounds such as voices and alarm sounds. The display unit 120e is configured using a display such as a liquid crystal display or an organic electroluminescence (EL). The audio output unit 120f is configured using a speaker or the like.

The operation unit 120d receives an input of the operation by the user and outputs signals corresponding to the various received operation contents to the ECU 122. The operation unit 120d is realized using a touch panel, buttons, switches, a jog dial, and the like.

The car navigation system 120 configured as described above superimposes the position information related to the current position of the vehicle 10 acquired by the GPS sensor 120a on the map corresponding to the map data stored in the map database 120b, whereby the user is notified of information including the road on which the vehicle 10 is currently traveling and a traveling route to the destination using the display unit 120e and the audio output unit 120f.

The recording unit 121 records various types of information related to the vehicle 10. The recording unit 121 records CAN data of the vehicle 10 input from the ECU 122, data during various processes executed by the ECU 122, and the like. The recording unit 121 includes a vehicle model information recording unit 121a related to the vehicle 10, an electric power supply information recording unit 121b that stores electric power supply information indicating suppliable electric energy by the vehicle 10, and a program recording unit 121c that records various programs executed by the vehicle 10. Here, the vehicle model information includes a vehicle model of the vehicle 10, identification information for identifying the vehicle 10, a model year of the vehicle 10, presence or absence of the electric power generation function, information indicating any one of HEV, PHEV, FCEV, and BEV, and the like. The electric power supply information is suppliable electric energy (kilowatt (kW)) by the vehicle 10, a suppliable voltage (for example, 100 volts (V) or 200 V), a current value, the maximum capacity and the maximum electric power generation amount (kilowatt per hour (kWh)) of the secondary battery 106, and the like. The recording unit 121 is configured using a DRAM, a ROM, a flash memory, an SSD, or the like.

The ECU 122 is configured using a memory and a processor provided with hardware such as a CPU. The ECU 122 controls the operation of each unit constituting the vehicle 10. The ECU 122 includes an acquisition unit 122a, an identification unit 122b, a fixing unit 122c, an electric power supply control unit 122d, a determination unit 122e, and an output control unit 122f. Note that, in the first embodiment, the ECU 122 functions as a control device.

The acquisition unit 122a communicates with each of the vehicles $10_1$ to $10_n$ via the second external communication unit 119, and acquires the electric power supply information and the vehicle model information from each of the vehicles $10_1$ to $10_n$ and acquires the electric power demand information from the charge-discharge device 20. Further, the acquisition unit 122a acquires the remaining amount of predetermined fuel for each vehicle 10 provided with the electric power generation function and the SOCs of the secondary batteries 106 of the vehicles $10_1$ to $10_n$.

The identification unit 122b identifies the vehicle 10 provided with the electric power generation function based on the vehicle model information of the vehicles $10_1$ to $10_n$ acquired by the acquisition unit 122a (step S102). Specifically, the identification unit 122b identifies any of HEV, PHEV, and FCEV as the vehicle 10 provided with the electric power generation function based on the vehicle model information of the vehicles $10_1$ to $10_n$ acquired by the acquisition unit 122a. The acquisition unit 122a acquires the remaining amount of the predetermined fuel from the vehicle 10 identified by the identification unit 122b. Further, the acquisition unit 122a acquires the remaining amount of the predetermined fuel for each vehicle 10 provided with the electric power generation function and the SOCs of the secondary batteries 106 of the vehicles $10_1$ to $10_n$.

The fixing unit 122c fixes a master vehicle 10 based on the electric power supply information acquired from each of the vehicles $10_1$ to $10_n$ by the acquisition unit 122a and the remaining amount of fuel of the vehicle 10 identified by the identification unit 122b. The master vehicle 10 controls electric power supply from the vehicles $10_1$ to $10_n$ when the vehicles $10_1$ to $10_n$ supply electric power to the facility 40 via the charge-discharge device 20.

The electric power supply control unit 122d starts electric power supply while controlling the electric energy when each of the vehicles $10_1$ to $10_n$ supplies electric power to the facility 40 based on the electric power supply information of the master vehicle 10 and the electric power demand information of the charge-discharge device 20. The electric power supply control unit 122d adjusts the electric energy supplied by the master vehicle 10 and the electric energy supplied by the vehicle 10 that is newly connected and causes the master vehicle 10 and the new vehicle 10 to supply the adjusted electric power by performing inter-vehicle communication. In this case, the electric power supply control unit 122d gradually reduces the electric energy supplied by the master vehicle 10 and gradually increases the electric energy supplied by the newly connected vehicle 10 to the facility 40 by inter-vehicle communication or the like after a certain period of time has elapsed, for example, after five minutes. The electric power supply control unit 122d adjusts the electric energy supplied by the master vehicle 10 and the electric energy supplied by an external power source that is connected and causes the master vehicle 10 and the connected external power source to supply the adjusted electric power by performing inter-vehicle communication.

The determination unit 122e determines whether there is any vehicle 10 that is provided with the electric power generation function and in which the remaining amount of fuel is equal to or less than a first threshold value among the vehicles $10_1$ to $10_n$ that supply electric power. The determination unit 122e determines whether there is any vehicle 10 in which the SOC of the secondary battery 106 is equal to or lower than a second threshold value among the vehicles $10_1$ to $10_n$ that supply electric power.

The output control unit 122f outputs refueling information that instructs refueling to the communication terminal 50 or the display unit 120e associated with the vehicle 10 that is provided with the electric power generation function and in which the remaining amount of fuel is equal to or less than the first threshold value. The output control unit 122f outputs stop information that instructs stopping electric power supply to the communication terminal 50 or the display unit 120e associated with the vehicle 10 in which the SOC is equal to or less than the second threshold value.

Vehicle Process

Figure 4A:
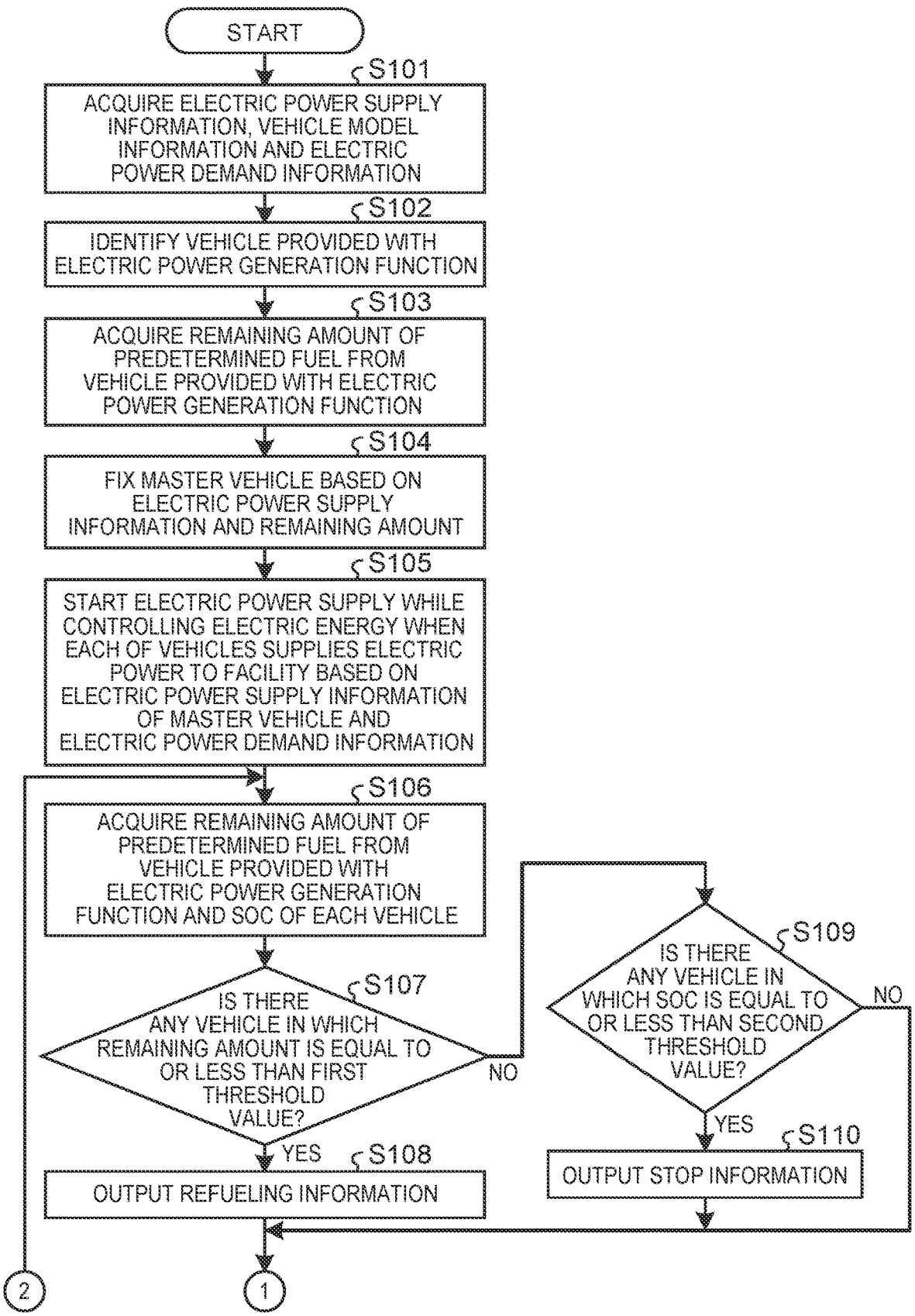
FIG. 4A shows a flowchart illustrating an outline of a process executed by a vehicle according to a second embodiment.
Figure 4B:
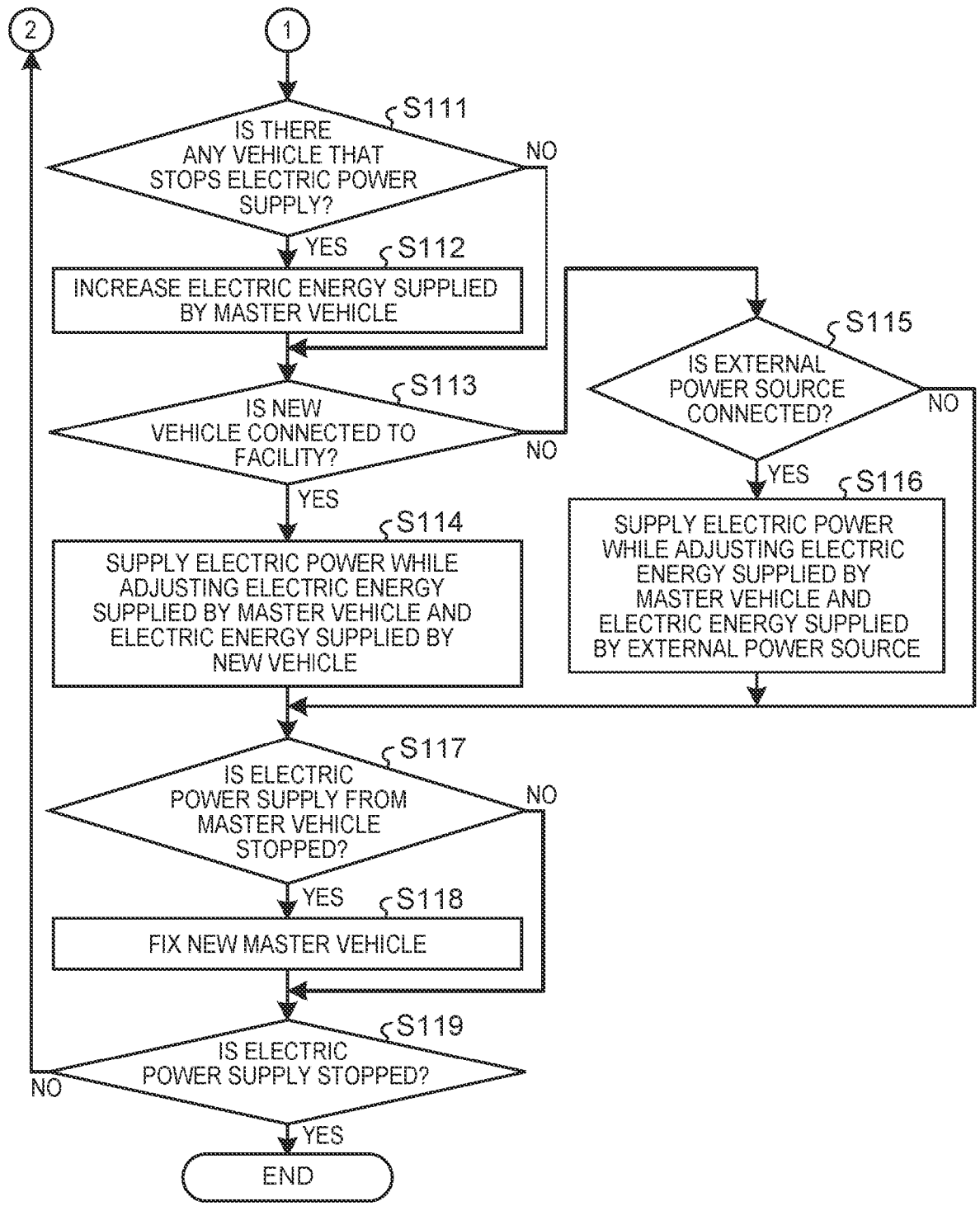
FIG. 4B shows a flowchart illustrating the outline of the process executed by the vehicle according to the second embodiment

Next, a process executed by the vehicle 10 will be described. FIGS. 4A and 4B show a flowchart illustrating an outline of the process executed by the vehicle 10. In the following, the process executed by any one of the vehicles $10_1$ to $10_n$ will be described. However, all the vehicles $10_1$ to $10_n$ may execute the process, and the representative vehicle 10 may execute the process as designated by the user.

As shown in FIG. 4A, first, the acquisition unit 122a communicates with each of the vehicles $10_1$ to $10_n$ via the second external communication unit 119, and acquires the electric power supply information and the vehicle model information from each of the vehicles $10_1$ to $10_n$ and acquires the electric power demand information from the charge-discharge device 20 (step S101).

Subsequently, the identification unit 122b identifies the vehicle 10 provided with the electric power generation function based on the vehicle model information of the vehicles $10_1$ to $10_n$ acquired by the acquisition unit $122a$ (step S102). Specifically, the identification unit $122b$ identifies any of HEV, PHEV, and FCEV as the vehicle 10 provided with the electric power generation function based on the vehicle model information of the vehicles $10_1$ to $10_n$ acquired by the acquisition unit $122a$.

After that, the acquisition unit $122a$ acquires the remaining amount of the predetermined fuel from the vehicle 10 identified by the identification unit $122b$ (step S103).

Subsequently, the fixing unit $122c$ fixes the master vehicle 10 based on the electric power supply information acquired from each of the vehicles $10_1$ to $10_n$ by the acquisition unit $122a$ and the remaining amount of fuel of the vehicle 10 identified by the identification unit $122b$. The master vehicle 10 controls electric power supply from the vehicles $10_1$ to $10_n$ when the vehicles $10_1$ to $10_n$ supply electric power to the facility 40 via the charge-discharge device 20. Specifically, the fixing unit $122c$ fixes, as the master vehicle 10, the vehicle 10 having the largest electric energy as a total of electric power supplied with the current SOC and electric power generated using the remaining amount of fuel among the vehicles $10_1$ to $10_n$, based on the electric power supply information acquired from each of the vehicles $10_1$ to $10_n$ by the acquisition unit $122a$ and the remaining amount of fuel of the vehicle 10 identified by the identification unit $122b$.

After that, the electric power supply control unit $122d$ starts electric power supply while controlling the electric energy when each of the vehicles $10_1$ to $10_n$ supplies electric power to the facility 40 based on the electric power supply information of the master vehicle 10 and the electric power demand information of the charge-discharge device 20 (step S105).

Subsequently, the acquisition unit $122a$ acquires the remaining amount of the predetermined fuel for each vehicle 10 provided with the electric power generation function and the SOCs of the secondary batteries 106 of the vehicles $10_1$ to $10_n$ (step S106).

Subsequently, the determination unit $122e$ determines whether there is any vehicle 10 that is provided with the electric power generation function and in which the remaining amount of fuel is equal to or less than the first threshold value among the vehicles $10_1$ to $10_n$ that supply electric power (step S107). Here, the first threshold value is a value of fuel with which the vehicle 10 can move from the current position to reach a refueling station at which the vehicle 10 can refuel the predetermined fuel, for example, gasoline or hydrogen. As a matter of course, the first threshold value can be changed as appropriate. For example, the first threshold value may be set in consideration of the congestion situation on the route to the refueling station, or when multiple refueling stations are present from the current position of the vehicle 10, the first threshold value can be changed to a value of fuel with which the vehicle 10 can travel a distance to the farthest refueling station. When the determination unit $122e$ determines that there is the vehicle 10 that is provided with the electric power generation function and in which the remaining amount of fuel is equal to or less than the first threshold value (step S107: Yes), the vehicle 10 proceeds to step S108 that will be described later. On the other hand, when the determination unit $122e$ determines that there is no vehicle 10 that is provided with the electric power generation function and in which the remaining amount of fuel is equal to or less than the first threshold value (step S107: No), the vehicle 10 proceeds to step S109 that will be described later.

In step S108, the output control unit $122f$ outputs the refueling information that instructs refueling to the communication terminal 50 or the display unit $120e$ associated with the vehicle 10 that is provided with the electric power generation function and in which the remaining amount of fuel is equal to or less than the first threshold value. With the above, the user of the vehicle 10 that is provided with the electric power generation function and in which the remaining amount of fuel is equal to or less than the first threshold value can intuitively understand the refueling timing of the vehicle 10 by checking the refueling information. After step S108, the vehicle 10 proceeds to step S111 that will be described later.

In step S109, the determination unit $122e$ determines whether there is any vehicle 10 in which the SOC of the secondary battery 106 is equal to or lower than the second threshold value among the vehicles $10_1$ to $10_n$ that supply electric power. Here, the second threshold value is the value of the SOC with which the vehicle 10 can move from the current position to the standby place. As a matter of course, the second threshold value can be changed as appropriate. For example, the second threshold may be set by setting the distance that the vehicle 10 can move from the current position to the outside of the disaster area as a travelable value. When the determination unit $122e$ determines that there is the vehicle 10 that is provided with the electric power generation function and in which the SOC of the secondary battery 106 is equal to or less than the second threshold value (step S109: Yes), the vehicle 10 proceeds to step S110 that will be described later. On the other hand, when the determination unit $122e$ determines that there is no vehicle 10 that is provided with the electric power generation function and in which the SOC of the secondary battery 106 is equal to or less than the second threshold value (step S109: No), the vehicle 10 proceeds to step S111 that will be described later.

In step S110, the output control unit $122f$ outputs stop information that instructs stopping electric power supply to the communication terminal 50 or the display unit $120e$ associated with the vehicle 10 that is provided with the electric power generation function and in which the SOC is equal to or less than the second threshold value. With the above, the user of the vehicle 10 in which the SOC is equal to or lower than the second threshold value can intuitively understand the timing to stop electric power supply. After step S110, the vehicle 10 proceeds to step S111 that will be described later.

Subsequently, the determination unit $122e$ determines whether there is any vehicle 10 that stops electric power supply among the vehicles $10_1$ to $10_n$ that supply electric power (step S111). Specifically, the determination unit $122e$ determines whether the stop information for stopping electric power supply is received from the vehicles $10_1$ to $10_n$ that supply electric power by inter-vehicle communication or the like. When the determination unit $122e$ receives the stop information, the determination unit $122e$ determines that there is the vehicle 10 that stops electric power supply. When the determination unit $122e$ determines that there is the vehicle 10 that stops electric power supply (step S111: Yes), the vehicle 10 proceeds to step S112 that will be described later. On the other hand, when the determination unit $122e$ determines that there is no vehicle 10 that stops electric power supply (step S111: No), the vehicle 10 proceeds to step S113 that will be described later.

In step S112, the electric power supply control unit $122d$ executes control to increase the electric energy supplied by the master vehicle 10. Specifically, the electric power supply control unit $122d$ executes control to increase the electric energy supplied by the master vehicle 10 so as to supplement the electric energy supplied by the vehicle 10 that stops the electric power supply to the facility 40. In this case, the electric power supply control unit 122d gradually increases the electric energy supplied by the master vehicle 10 and gradually reduces the electric energy supplied by the vehicle 10 that stops the electric power supply to the facility 40 by inter-vehicle communication or the like. With the above, the master vehicle 10 can suppress fluctuations in frequency by suppressing unbalancing between the electric energy supplied by each of the vehicles $10_1$ to $10_n$ and the demanded electric energy of the facility 40, whereby the frequency can be maintained constant. As a result, even when a large capacity of electric power is supplied by the vehicles $10_1$ to $10_n$, the frequency can be maintained constant. Therefore, it is possible to use the instruments in the facility 40 stably.

Subsequently, the determination unit 122e determines whether a new vehicle 10 is connected to the facility 40 (step S113). Specifically, the determination unit 122e determines whether a connection signal indicating that a new vehicle 10 is connected to the charge-discharge device 20 is input by the inter-vehicle communication, and determines that the new vehicle 10 is connected to the facility 40 when the connection signal is input. When the determination unit 122e determines that the new vehicle 10 is connected to the facility 40 (step S113: Yes), the vehicle 10 proceeds to step S114 that will be described later. On the other hand, when the determination unit 122e determines that the new vehicle 10 is not connected to the facility 40 (step S113: No), the vehicle 10 proceeds to step S115 that will be described later.

In step S114, the electric power supply control unit 122d adjusts the electric energy supplied by the master vehicle 10 and the electric energy supplied by the vehicle 10 that is newly connected and causes the master vehicle 10 and the new vehicle 10 to supply the adjusted electric power by performing inter-vehicle communication. In this case, the electric power supply control unit 122d gradually reduces the electric energy supplied by the master vehicle 10 and gradually increases the electric energy supplied by the newly connected vehicle 10 to the facility 40 by inter-vehicle communication or the like after a certain period of time has elapsed, for example, after five minutes. With the above, the master vehicle 10 can suppress fluctuations in the frequency of electric power by suppressing unbalancing between the electric energy supplied by each of the vehicles $10_1$ to $10_n$ and the demanded electric energy of the facility 40. Further, the electric power supply control unit 122d gradually reduces the electric energy supplied by the master vehicle 10 and gradually increases the electric energy supplied by the newly connected vehicle 10 to the facility 40 after a certain period of time has elapsed, whereby instantaneous voltage drop can be suppressed. Therefore, the frequency of electric power generated by the generator 102 can be maintained constant. After step S114, the vehicle 10 proceeds to step S117 that will be described later.

In step S115, the determination unit 122e determines whether the external power source is connected to the facility 40 or the charge-discharge device 20. Here, the external power source is a diesel generator, an emergency generator, and the like stocked in the facility 40, and is connected so as to supplement the electric energy supplied by the vehicle 10 that stops the electric power supply. The determination unit 122e determines whether a connection signal indicating that the external power source is connected to the charge-discharge device 20 is input via the communication unit 118, and determines that the external power source is connected when the connection signal is input. When the determination unit 122e determines that the external power source is connected to the facility 40 or the charge-discharge device 20 (step S115: Yes), the vehicle 10 proceeds to step S116 that will be described later. On the other hand, when the determination unit 122e determines that the external power source is not connected to the facility 40 or the charge-discharge device 20 (step S115: No), the vehicle 10 proceeds to step S117 that will be described later.

In step S116, the electric power supply control unit 122d adjusts the electric energy supplied by the master vehicle 10 and the electric energy supplied by the connected external power source and causes the master vehicle 10 and the connected external power source to supply the adjusted electric power by performing inter-vehicle communication. In this case, the electric power supply control unit 122d gradually reduces the electric energy supplied by the master vehicle 10 and gradually increases the electric energy supplied by the connected external power source to the facility 40. With the above, the master vehicle 10 can suppress fluctuations in the frequency by suppressing unbalancing between the demanded electric energy of the facility 40 and supplied electric energy that is a total of the electric energy supplied by each of the vehicles $10_1$ to $10_n$ and the electric energy supplied by the external power source. After step S116, the vehicle 10 proceeds to step S117 that will be described later.

In step S117, the determination unit 122e determines whether the master vehicle 10 stops electric power supply. Specifically, the determination unit 122e determines whether a stop signal for stopping electric power supply is input from the operation unit 120d as the user operates the operation unit 120d of the car navigation system 120. When the determination unit 122e determines that the master vehicle 10 stops electric power supply (step S117: Yes), the vehicle 10 proceeds to step S118 that will be described later. On the other hand, when the determination unit 122e determines that the master vehicle 10 does not stop electric power supply (step S117: No), the vehicle 10 proceeds to step S119 that will be described later.

In step S118, the fixing unit 122c fixes a new master vehicle 10. Specifically, the fixing unit 122c fixes, as the next master vehicle 10, the vehicle 10 with the largest remaining amount of fuel among the vehicles $10_1$ to $10_n$ provided with the electric power generation function, excluding the master vehicle 10.

Subsequently, the determination unit 122e determines whether electric power supply from each of the vehicles $10_1$ to $10_n$ to the facility 40 is stopped. When the determination unit 122e determines that electric power supply from each of the vehicles $10_1$ to $10_n$ to the facility 40 is stopped (step S119: Yes), the vehicle 10 terminates this process. On the other hand, when the determination unit 122e determines that electric power supply from each of the vehicles $10_1$ to $10_n$ to the facility 40 is not stopped (step S119: No), the vehicle 10 returns to step S106.

According to the first embodiment described above, the ECU 122 acquires the electric power supply information indicating the suppliable electric energy by each of the vehicles $10_1$ to $10_n$ and the electric power demand information indicating the demanded electric energy of the facility 40 to which the vehicles $10_1$ to $10_n$ supply electric power. After that, the ECU 122 fixes the master vehicle 10 that controls electric power supply of each of the vehicles $10_1$ to $10_n$ from among the vehicles $10_1$ to $10_n$ based on the electric power supply information. The electric energy when each of the vehicles $10_1$ to $10_n$ supplies electric power to the facility 40 is controlled based on the electric power supply information of the master vehicle 10 and the electric power demand information of the facility 40. With the above, fluctuations in the frequency can be suppressed by suppressing unbalancing between the electric energy supplied by each of the vehicles $10_1$ to $10_n$ and the demanded electric energy of the facility 40, whereby the frequency can be maintained constant. As a result, even when a large capacity of electric power is supplied by the vehicles $10_1$ to $10_n$, the frequency can be maintained constant. Therefore, it is possible to use the instruments in the facility 40 stably.

Further, according to the first embodiment, the ECU 122 determines whether each of the vehicles $10_1$ to $10_n$ is provided with the electric power generation function using predetermined fuel based on the vehicle model information, and acquires the remaining amount of the predetermined fuel from the vehicle 10 provided with the electric power generation function. After that, the ECU 122 fixes the master vehicle 10 based on the remaining amount of fuel of the vehicle 10 provided with the electric power generation function and the electric power supply information of the vehicles $10_1$ to $10_n$. With the above, the vehicle 10 having the largest electric energy to be supplied to the facility 40 is set as the master vehicle 10, whereby the electric power can be stably supplied to the facility 40 for a long time.

Further, according to the first embodiment, the ECU 122 outputs the instruction information for instructing refueling to the vehicle 10 that is provided with the electric power generation function and that is determined by the ECU 122 that the remaining amount of fuel is equal to or less than the threshold value. With the above, the user of the vehicle 10 that is provided with the electric power generation function and for which the remaining amount of fuel is determined as equal to or less than the threshold value can intuitively understand the refueling timing.

Further, according to the first embodiment, when any one of the vehicles 10 provided with the electric power generation function stops electric power supply to the facility 40, the ECU 122 executes control to increase the electric energy supplied by the master vehicle 10 so as to supplement the electric energy supplied by the vehicle 10 that is provided with the electric power generation function and that stops electric power supply to the facility 40. With the above, fluctuations in the frequency can be suppressed by suppressing unbalancing between the electric energy supplied by each of the vehicles $10_1$ to $10_n$ and the demanded electric energy of the facility 40, whereby the frequency can be maintained constant.

Further, according to the first embodiment, the ECU 122 executes the control to adjust the electric energy supplied by the master vehicle 10 and the electric energy supplied by the new vehicle 10 to the facility 40. This makes it possible to suppress an instantaneous voltage drop that occurs when the new vehicle 10 starts electric power supply to the facility 40.

Further, according to the first embodiment, the ECU 122 executes control to reduce the electric energy supplied by the master vehicle 10 to the electric energy immediately after the electric power supply to the facility 40 is started and increase the electric energy supplied by the new vehicle 10 to the facility 40 after a certain period of time has elapsed. This makes it possible to suppress an instantaneous voltage drop that occurs when the new vehicle 10 starts electric power supply to the facility 40.

Further, according to the first embodiment, when the ECU 122 determines that the vehicle 10 provided with the electric power generation function stops electric power supply to the facility 40, the ECU 122 drives the external power source to start electric power supply to the facility 40. Therefore, fluctuations in the frequency can be suppressed by suppressing unbalancing between the electric energy supplied by each of the vehicles $10_1$ to $10_n$ and the demanded electric energy of the facility 40, whereby the frequency can be maintained constant.

Further, according to the first embodiment, when the external power source starts electric power supply to the facility 40, the ECU 122 executes control to adjust the electric energy supplied by the master vehicle 10 to the facility 40 and the electric energy supplied by the external power source to the facility 40. With the above, fluctuations in the frequency can be suppressed by suppressing unbalancing between the electric energy supplied by each of the vehicles $10_1$ to $10_n$ and the demanded electric energy of the facility 40, whereby the frequency can be maintained constant.

Further, according to the first embodiment, when the ECU 122 determines that the master vehicle 10 stops electric power supply to the facility 40, the ECU 122 fixes a new vehicle 10 from among the vehicles $10_1$ to $10_n$ based on the electric power supply information of each of the vehicles $10_1$ to $10_n$ whereby the master vehicle 10 can be switched sequentially.

Further, according to the first embodiment, the ECU 122 fixes the vehicle 10 having the largest remaining amount of fuel as the master vehicle 10. Therefore, even when the master vehicle 10 is switched, electric power can be supplied from each of the vehicles $10_1$ to $10_n$ to the facility 40 without delay for a long period of time.

Note that, in the first embodiment, the ECU 122 functions as a control device. However, the present disclosure is not limited to this, and, for example, the charge-discharge control unit 25 may have the functions of the ECU 122, that is, the acquisition unit 122a, the identification unit 122b, the fixing unit 122c, the electric power supply control unit 122d, the determination unit 122e and the output control unit 122f.

Second Embodiment

Hereinafter, a second embodiment will be described. In the first embodiment, the master vehicle 10 that controls electric power supply is fixed by each vehicle 10 performing inter-vehicle communication. However in the second embodiment, a server that can communicate with the vehicles $10_1$ to $10_n$ via the network is provided, and the server controls electric power supply of each vehicle 10. Hereinafter, the same configuration as that of the electric power system 1 according to the first embodiment is designated by the same reference symbol, and detailed description thereof will be omitted.

Outline Configuration of Electric Power System

Figure 5:
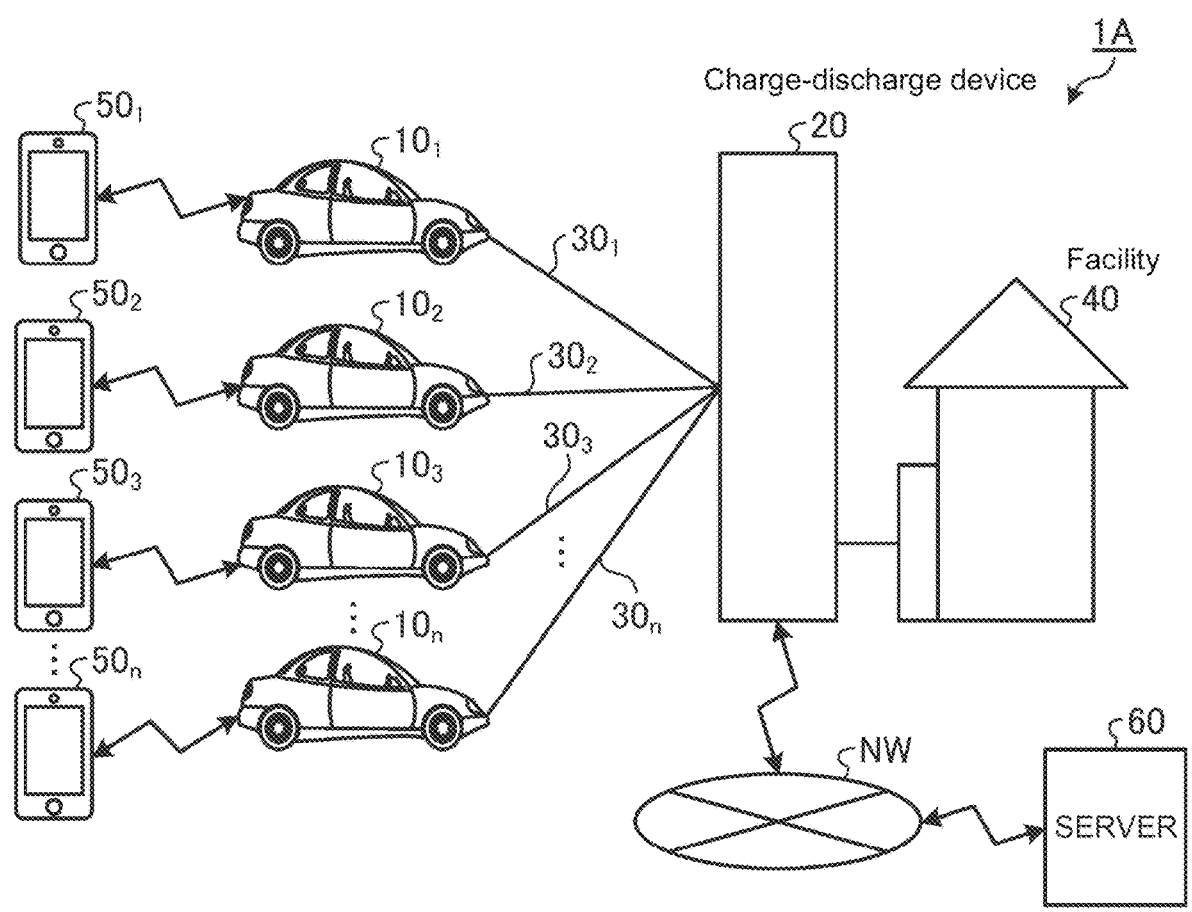
FIG. 5 is a diagram showing a schematic configuration of an electric power system according to the second embodiment.

FIG. 5 is a diagram showing a schematic configuration of an electric power system according to a second embodiment. In addition to the configuration of the electric power system 1 according to the first embodiment, an electric power system IA shown in FIG. 5 further includes a server 60 that can communicate with the vehicles $10_1$ to $10_n$, the charge-discharge device 20, and the communication terminals $50_1$ to $50_m$ via a network NW. The network NW is composed of, for example, the Internet network and a mobile phone network.

Functional Configuration of Server

Figure 6:
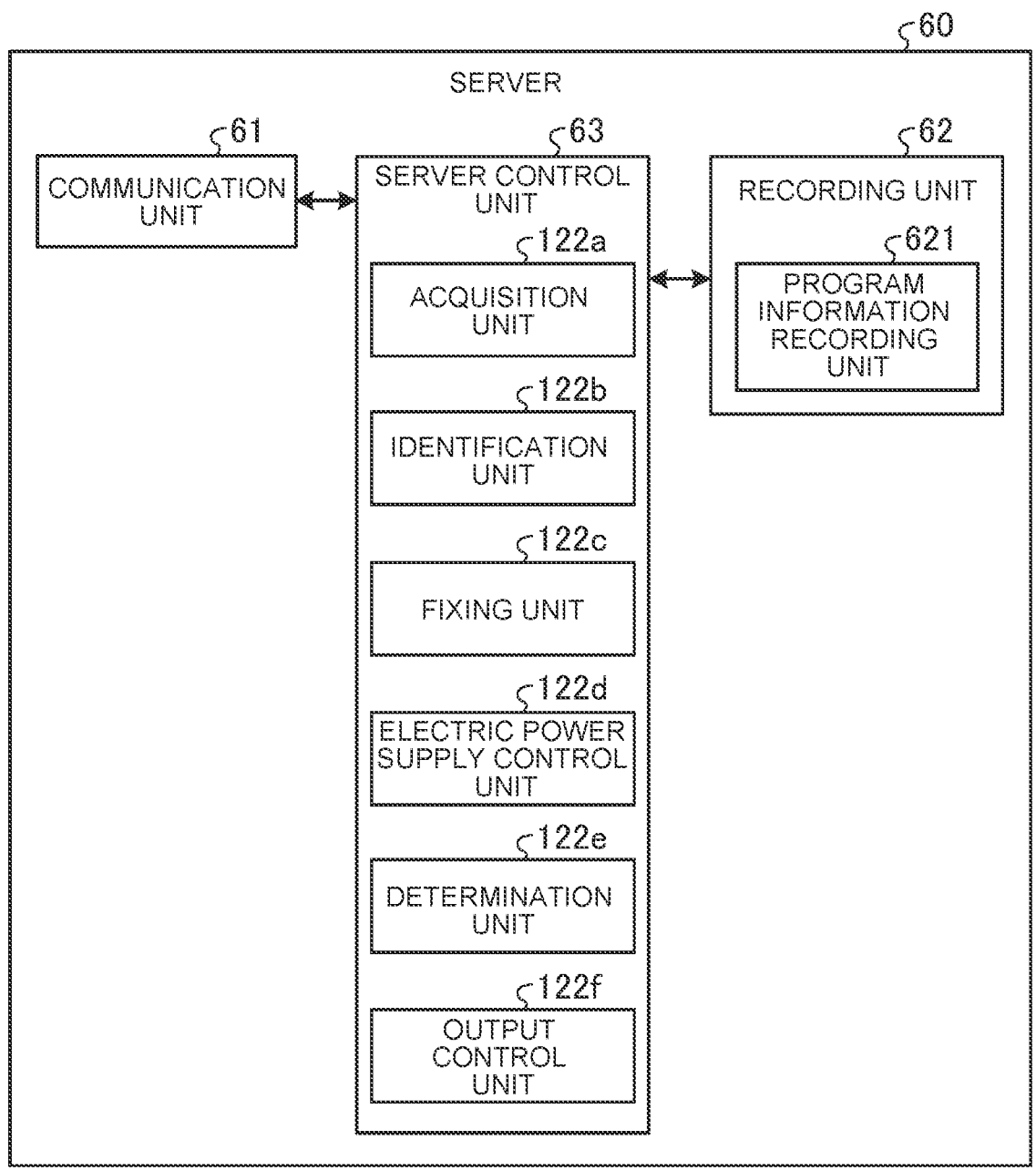
FIG. 6 is a block diagram showing the functional configuration of a server according to the second embodiment.

Next, the functional configuration of the server 60 will be described. FIG. 6 is a block diagram showing the functional configuration of the server 60.

As shown in FIG. 6, the server 60 includes a communication unit 61, a recording unit 62, and a server control unit 63.

Under the control of the server control unit 63, the communication unit 61 receives various types of information from the vehicles $10_1$ to $10_n$, the charge-discharge device 20, and the communication terminals $50_1$ to $50_m$ via the network NW. Further, under the control of the server control unit 63, the communication unit 61 transmits various types of information to the vehicles $10_1$ to $10_n$, the charge-discharge device 20, and the communication terminals $50_1$ to $50_m$. The communication unit 61 is configured using a communication module or the like capable of transmitting and receiving various types of information.

The recording unit 62 records various types of information related to the server. The recording unit 62 includes a program recording unit 621 that executes various programs executed by the server 60. The recording unit 62 is configured using a DRAM, a ROM, a flash memory, an HDD, an SSD, or the like.

The server control unit 63 controls each unit constituting the server 60. The server control unit 63 is configured using a memory and a processor provided with hardware such as a CPU. The server control unit 63 is provided with the function equivalent to the ECU 122 of the vehicle 10, and includes the acquisition unit 122a, the identification unit 122b, the fixing unit 122c, the electric power supply control unit 122d, the determination unit 122e, and the output control unit 122f. Note that, in the second embodiment, the server control unit 63 functions as a control device.

According to the second embodiment described above, similar to the first embodiment, fluctuations in the frequency can be suppressed by suppressing unbalancing between the electric energy supplied by each of the vehicles $10_1$ to $10_n$ and the demanded electric energy of the facility 40, whereby the frequency can be maintained constant. As a result, even when a large capacity of electric power is supplied by the vehicles $10_1$ to $10_n$, the frequency can be maintained constant. Therefore, it is possible to use the instruments in the facility 40 stably.

Other Embodiments

Further, in the first and second embodiments, the above-mentioned "unit" can be read as "circuit" or the like. For example, the control unit can be read as a control circuit.

Further, the program to be executed by the electric power system according to the first and second embodiments is stored and provided as file data in an installable format or an executable format in a computer-readable recording medium (storage medium) such as a compact disc (CD)-ROM, a flexible disk (FD), a compact disc-recordable (CD-R), or a digital versatile disk (DVD), universal serial bus (USB) media, or flash memory.

The program to be executed by the electric power system according to the first and second embodiments may be configured to be stored in a computer connected to a network such as the Internet and provided through downloading via the network.

Note that, in the description of the flowchart in the present specification, the order of the processing between steps is clarified using expressions such as "first", "after that", and "subsequently". However, the order of processing required for realizing the embodiment is not always uniquely defined by those representations. That is, the order of processing in the flowchart described in the present specification can be changed within a consistent range.

Further effects and modifications can be easily derived by those skilled in the art. The broader aspects of the disclosure are not limited to the particular details and representative embodiments shown and described above. Accordingly, various modifications can be made without departing from the spirit or scope of the general inventive concept as defined by the appended claims and their equivalents.

What is claimed is:

1. A control device comprising a processor configured to:
   acquire electric power supply information indicating suppliable electric energy by each of a plurality of vehicles and electric power demand information indicating demanded electric energy of a facility to which each of the vehicles supplies electric power;
   fix a master vehicle that controls electric power supply of each of the vehicles from among the vehicles based on the electric power supply information;
   control electric energy when each of the vehicles supplies the electric power to the facility based on the electric power supply information of the master vehicle and the electric power demand information;
   acquire vehicle model information indicating a vehicle model of each of the vehicles;
   determine whether each of the vehicles is provided with an electric power generation function using predetermined fuel based on the vehicle model information;
   acquire a remaining amount of the predetermined fuel from the vehicle provided with the electric power generation function; and
   fix the master vehicle based on the remaining amount and the electric power supply information.

2. The control device according to claim 1, wherein the processor:
   determines whether the remaining amount is equal to or less than a threshold value for each of the vehicles provided with the electric power generation function; and
   outputs instruction information for instructing refueling of the fuel to the vehicle that is provided with the electric power generation function and for which the remaining amount is determined as equal to or less than the threshold value.

3. The control device according to claim 2, wherein the processor executes control to, when any of the vehicles provided with the electric power generation function stops electric power supply to the facility, increase electric energy supplied by the master vehicle so as to supplement electric energy supplied by the vehicle that is provided with the electric power generation function and that stops the electric power supply to the facility.

4. The control device according to claim 3, wherein the processor:
   determines whether a new vehicle is connected to the facility; and
   executes control to adjust the electric energy supplied by the master vehicle and electric energy supplied by the new vehicle to the facility when the processor determines that the new vehicle is connected to the facility.

5. The control device according to claim 4, wherein the processor executes control to reduce the electric energy supplied by the master vehicle to electric energy immediately after the electric power supply to the facility is started and increase the electric energy supplied by the new vehicle to the facility after a certain period of time has elapsed.

6. The control device according to claim 3, wherein the control device:
   determines whether any of the vehicles provided with the electric power generation function stops the electric power supply to the facility; and starts electric power supply to the facility by driving an external power source when the control device determines that the any of the vehicles provided with the electric power generation function stops the electric power supply to the facility.

7. The control device according to claim 6, wherein the processor executes control to adjust the electric energy supplied by the master vehicle to the facility and electric energy supplied by the external power source to the facility when the external power source starts the electric power supply to the facility.

8. The control device according to claim 1, wherein the processor:
   determines whether the master vehicle stops electric power supply to the facility; and
   fixes a new master vehicle from among the vehicles based on the electric power supply information when the processor determines that the master vehicle stops the electric power supply to the facility.

9. The control device according to claim 1, wherein the processor fixes the vehicle in which the remaining amount is the largest as the master vehicle.

10. The control device according to claim 1, wherein:
    the control device is implemented in at least one of the vehicles; and
    the processor acquires the electric power supply information in accordance with a predetermined wireless communication standard.

11. A server comprising a processor configured to:
    acquire electric power supply information indicating suppliable electric energy by each of a plurality of vehicles and electric power demand information indicating demanded electric energy of a facility to which each of the vehicles supplies electric power;
    fix a master vehicle that controls electric power supply of each of the vehicles from among the vehicles based on the electric power supply information;
    control electric energy when each of the vehicles supplies the electric power to the facility based on the electric power supply information of the master vehicle and the electric power demand information;
    acquire vehicle model information indicating a vehicle model of each of the vehicles;
    determine whether each of the vehicles is provided with an electric power generation function using predetermined fuel based on the vehicle model information;
    acquire a remaining amount of the predetermined fuel from the vehicle provided with the electric power generation function; and
    fix the master vehicle based on the remaining amount and the electric power supply information.

12. The server according to claim 11, wherein the processor:
    determines whether the remaining amount is equal to or less than a threshold value for each of the vehicles provided with the electric power generation function; and
    outputs instruction information for instructing refueling of the fuel to the vehicle that is provided with the electric power generation function and for which the remaining amount is determined as equal to or less than the threshold value.

13. The server according to claim 12, wherein the processor executes control to, when any of the vehicles provided with the electric power generation function stops electric power supply to the facility, increase electric energy supplied by the master vehicle so as to supplement electric energy supplied by the vehicle that is provided with the electric power generation function and that stops the electric power supply to the facility.

14. The server according to claim 13, wherein the processor:
    determines whether a new vehicle is connected to the facility; and
    executes control to adjust the electric energy supplied by the master vehicle and electric energy supplied by the new vehicle to the facility when the processor determines that the new vehicle is connected to the facility.

15. The server according to claim 14, wherein the server executes control to reduce the electric energy supplied by the master vehicle to electric energy immediately after the electric power supply to the facility is started and increase the electric energy supplied by the new vehicle to the facility after a certain period of time has elapsed.

16. The server according to claim 13, wherein the server:
    determines whether any of the vehicles provided with the electric power generation function stops the electric power supply to the facility; and
    starts electric power supply to the facility by driving an external power source when the server determines that the any of the vehicles provided with the electric power generation function stops the electric power supply to the facility.

17. The server according to claim 16, wherein the processor executes control to adjust the electric energy supplied by the master vehicle to the facility and electric energy supplied by the external power source to the facility when the external power source starts the electric power supply to the facility.

18. A non-transitory storage medium storing a program that causes a processor to:
    acquire electric power supply information indicating suppliable electric energy by each of a plurality of vehicles and electric power demand information indicating demanded electric energy of a facility to which each of the vehicles supplies electric power;
    fix a master vehicle that controls electric power supply of each of the vehicles from among the vehicles based on the electric power supply information;
    control electric energy when each of the vehicles supplies the electric power to the facility based on the electric power supply information of the master vehicle and the electric power demand information;
    acquire vehicle model information indicating a vehicle model of each of the vehicles;
    determine whether each of the vehicles is provided with an electric power generation function using predetermined fuel based on the vehicle model information;
    acquire a remaining amount of the predetermined fuel from the vehicle provided with the electric power generation function; and
    fix the master vehicle based on the remaining amount and the electric power supply information.

* * * * *